Figure 1:
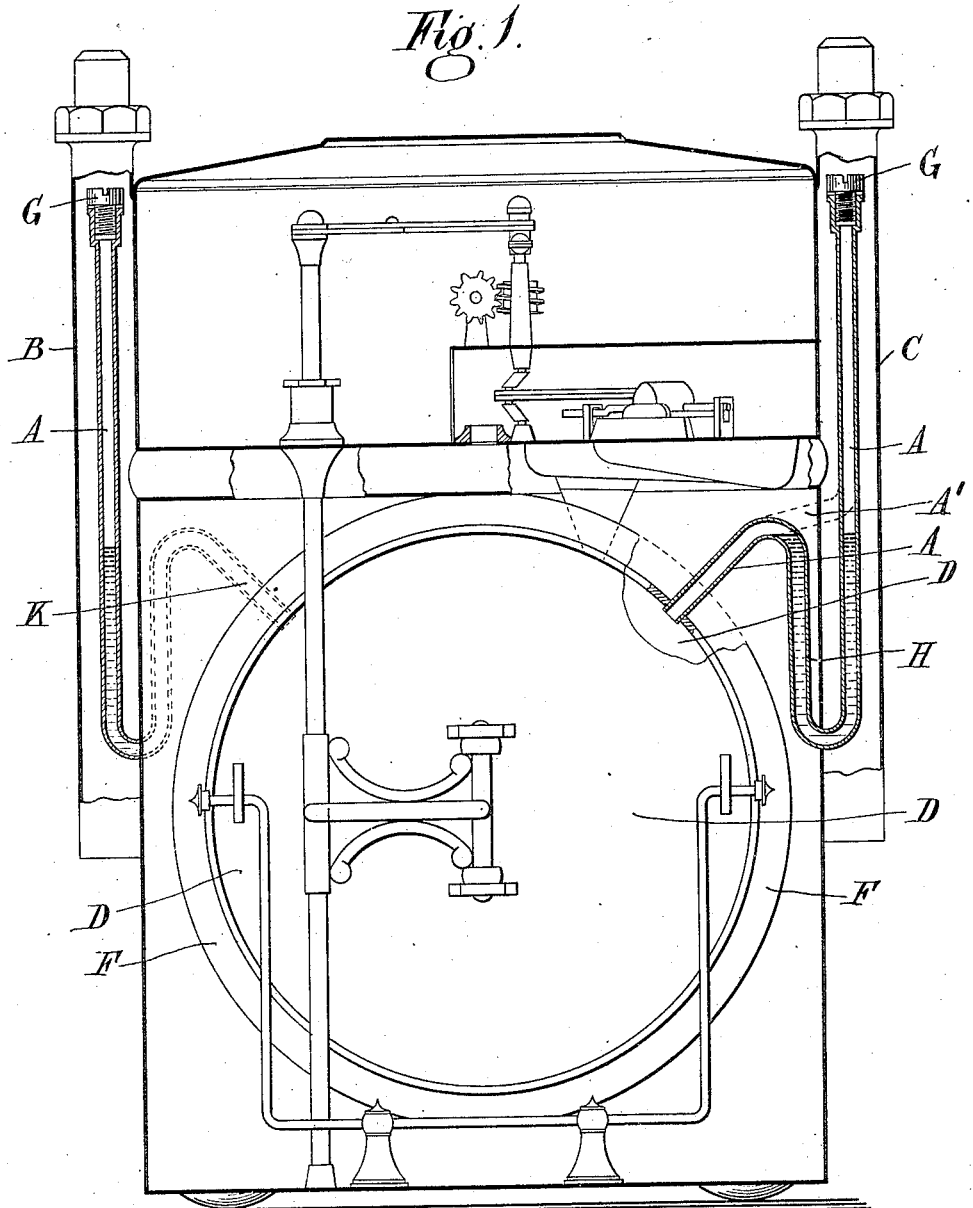

T. GLOVER.
GAS METER.
APPLICATION FILED JUNE 25, 1910.

988,186.

Patented Mar. 28, 1911.
2 SHEETS—SHEET 1.

Witnesses:

Inventor
Thomas Glover
By
James L. Norris
Atty

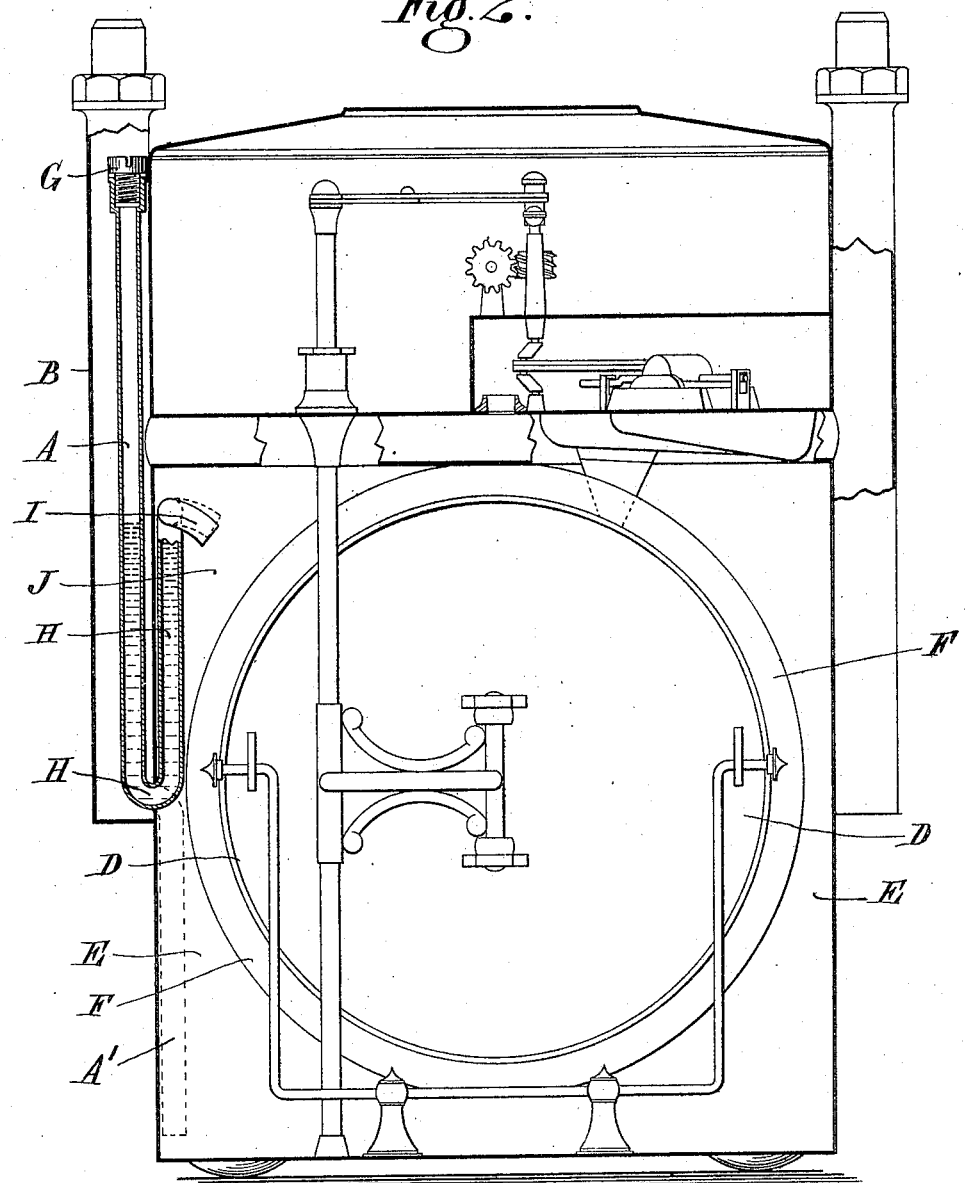

UNITED STATES PATENT OFFICE.

THOMAS GLOVER, OF EDMONTON, ENGLAND.

GAS-METER.

988,186. Specification of Letters Patent. Patented Mar. 28, 1911.

Application filed June 25, 1910. Serial No. 568,882.

*To all whom it may concern:*

Be it known that I, THOMAS GLOVER, a subject of the King of Great Britain, residing at Edmonton, Middlesex, England, have invented certain new and useful Improvements in Gas-Meters, of which the following is a specification.

The object of this invention is improvements in gas meters whereby the leather or flexible portion of the bellows can be kept well saturated with oil or equivalent material.

My invention will be clearly understood from the following description aided by the accompanying drawings in which:—

Figure 1 is a side elevation of a dry gas meter with my appliance for supplying the inside of the bellows with oil. Fig. 2 is a similar view with my appliance for supplying the outside of the bellows with oil.

For the purpose of my invention I position a pipe or tube A within either the inlet pipe B or outlet pipe C or within both as in Fig. 1, and lead the same either into the bellows D as in Fig. 1 or into the body E of the meter as in Fig. 2 outside the bellows D and into this pipe or these pipes A, I pour oil or its equivalent in sufficient quantity so that each bellows D or each compartment E of the body of the meter is supplied with oil, which is led to or touches a portion of the leather or flexible part F of the bellows which becomes saturated all over by capillary attraction.

The top of each pipe A which is inside the inlet pipe B or outlet pipe C of the meter is provided with a screw stopper G or other closing device so as to prevent any passage of gas through the pipe when the meter is connected up with the main and supply pipe, and the tube whether leading oil to the inside or outside of the diaphragm D may lead directly into the bellows or chamber as by dotted lines A' or be bent back on itself as at H, Figs. 1 and 2, and be filled with oil or its equivalent to form a seal or trap to prevent the escape of gas when the screw G is removed.

If I use only one oil pipe A, I provide the same with a branch I, which conducts oil to the inside or the outside of both bellows or both chambers, the branch I being passed to the other side of the division plate J, but when I use an oil pipe in both the inlet and the outlet pipe of the meter as shown in Fig. 1, one pipe A can supply oil to the bellows D as shown in full lines (or it may be the chamber) on one side of the division plate J of the meter and the other pipe supply oil to the bellows (or it may be the chamber) on the other side of the division plate J as shown in dotted lines K.

The pipe or pipes may be arranged to reach the bottom of the bellows or bottom of the meter as shown at A' in Fig. 2 so that surplus oil or condensations can be drawn off by a suction pump which can be attached to the screw threaded end of the pipe.

What I do claim as my invention and desire to secure by Letters Patent is:—

1. In a gas meter having the usual inlet and outlet circulation pipes and a bellows; an oil supply tube arranged in one of the pipes and having an end which extends into the meter casing to a point where it will supply oil to the flexible portion of the bellows, and a removable closure for the tube.

2. In a gas meter having the usual inlet and outlet circulation pipes, a bellows, and a division plate; an oil supply tube arranged in one of the pipes and provided with a branch which has discharge ends in the compartments defined by the division plate and at such location as to supply oil to the flexible portion of the bellows, and a removable closure for the tube.

3. In a gas meter having the usual inlet and outlet circulation pipes, and a bellows; an oil supply tube arranged in one of the pipes, said tube having a bend which forms a seal and having an end which extends into the meter casing to a point where it will supply oil to the flexible portion of the bellows, and a removable closure for the tube.

In testimony whereof I have hereunto set my hand in presence of two subscribing witnesses.

THOMAS GLOVER.

Witnesses:
WM. O. BROWN,
F. C. SMITH.

---

Copies of this patent may be obtained for five cents each, by addressing the "Commissioner of Patents, Washington, D. C."